(12) United States Patent
Su et al.

(10) Patent No.: US 12,090,429 B1
(45) Date of Patent: Sep. 17, 2024

(54) FILTER DEVICE, FAUCET WATER PURIFIER AND SPRAYING PROCESS THEREOF

(71) Applicant: Dongguan Beyclean Environmental Protection Technology Co., Ltd, Guangdong (CN)

(72) Inventors: Kaifeng Su, Guangdong (CN); Xiaoliang Tong, Guangdong (CN); Hai Lin, Guangdong (CN); Cheng Luo, Guangdong (CN); Haibo Xie, Guangdong (CN); Jiawei Du, Guangdong (CN)

(73) Assignee: Dongguan Beyclean Environmental Protection Technology Co., Ltd, Guangdong (CN)

( * ) Notice: Subject to any disclaimer, the term of this patent is extended or adjusted under 35 U.S.C. 154(b) by 0 days.

(21) Appl. No.: 18/599,312

(22) Filed: Mar. 8, 2024

(30) Foreign Application Priority Data

Jan. 30, 2024 (CN) .......................... 202410134884.3

(51) Int. Cl.
*B01D 35/04* (2006.01)
*B01D 29/56* (2006.01)
(Continued)

(52) U.S. Cl.
CPC .......... *B01D 35/046* (2013.01); *B01D 29/56* (2013.01); *B01D 29/90* (2013.01); *B01D 35/1573* (2013.01); *B01D 35/303* (2013.01); *B01D 39/12* (2013.01); *B01D 39/1623* (2013.01); *B01D 39/2065* (2013.01); *B01D 61/145* (2013.01); *C02F 1/003* (2013.01); *B01D 2201/165* (2013.01); *B01D 2201/282* (2013.01); *B01D 2201/309* (2013.01); *B01D 2221/02* (2013.01);
(Continued)

(58) Field of Classification Search
CPC ...... B01D 35/046; B01D 29/56; B01D 29/90; B01D 35/1573; B01D 35/303; B01D 39/12; B01D 39/1623; B01D 39/2065; B01D 61/145; B01D 2201/165; B01D 2201/282; B01D 2201/309; B01D 2221/02; B01D 2239/065; B01D 2313/901; C02F 1/003; C02F 2201/007; C02F 2307/06
See application file for complete search history.

(56) References Cited

U.S. PATENT DOCUMENTS

2009/0008318 A1* 1/2009 Anes .................. C02F 9/00 210/287

FOREIGN PATENT DOCUMENTS

| CN | 219517974 U | * | 8/2023 | |
| JP | 2014128803 A | * | 7/2014 | |
| WO | WO-2017135429 A1 | * | 8/2017 | ............. B01D 35/04 |

OTHER PUBLICATIONS

English language machine translation of WO 2017135429, 7 pages, No Date.*

(Continued)

*Primary Examiner* — Pranav N Patel
(74) *Attorney, Agent, or Firm* — Cooper Legal Group, LLC (57) ABSTRACT

A filter device comprises a first filter mechanism and a second filter mechanism, the first filter mechanism is connected to the second filter mechanism, wherein the first filter is configured to filter disinfectants, impurities, and organic matters in water, and the second filter is configured to filter germs in the water. A faucet water purifier comprises above filter device.

5 Claims, 8 Drawing Sheets

(51) Int. Cl.
   *B01D 29/90*      (2006.01)
   *B01D 35/157*     (2006.01)
   *B01D 35/30*      (2006.01)
   *B01D 39/12*      (2006.01)
   *B01D 39/16*      (2006.01)
   *B01D 39/20*      (2006.01)
   *B01D 61/14*      (2006.01)
   *C02F 1/00*       (2023.01)

(52) U.S. Cl.
   CPC .. *B01D 2239/065* (2013.01); *B01D 2313/901* (2022.08); *C02F 2201/007* (2013.01); *C02F 2307/06* (2013.01)

(56) References Cited

OTHER PUBLICATIONS

English language machine translation of CN219517974U, 20 pages, No Date.*
English language machine translation of JP2014-128803-A, 9 pages, No Date.*

* cited by examiner

FILTER DEVICE, FAUCET WATER PURIFIER AND SPRAYING PROCESS THEREOF

CROSS-REFERENCE TO RELATED APPLICATION

This application claims the priority and benefit of Chinese patent application No. 202410134884.3, filed on Jan. 30, 2024. The entirety of Chinese patent application No. 202410134884.3 is hereby incorporated by reference herein and made a part of this specification.

TECHNICAL FIELD

The present application relates to a field of water filter, and in particular, to a filter device, a faucet water purifier and a spraying process thereof.

BACKGROUND

A faucet water purifier is a micro filtering-water device/equipment directly mounted on and hanged on the home faucet. The faucet water purifier has an effect of immediately improving a water quality, and a program of installation and maintenance of which is simply and convenience. The faucet water purifier is generally mounted on a faucet in home bathroom, to filter bleaching powder, chloramine and other disinfectants in water, thereby ensuring that the user utilize purified water to wash face or take a shower, which has an effect of beauty and protection for the skin.

The existing technologies discloses a faucet water purifier, comprising a waterway switching main body and a filtering cartridge, wherein the waterway switching main body comprises a guiding-water pipe and a valve core, an inlet and an outlet are provided on the upper end and down end of the guiding-water pipe, respectively, a flower path is provided in the guiding-water pipe along a front-back direction and in communication with the filtering cartridge, the valve core is axially mounted in the flower path in front-back extending way, a handle exposed out of the guiding-water pipe is fixedly connected to the front end of the valve core, a path in communication with the flower path is provided in the valve core, a water hole in communication with the inlet is provided on one end of the path, and a groove configured to be in communication with the inlet and the outlet is provided on an outer wall of the valve core; and a connection pipe is provided on the back end of the guiding-water pipe, the front end of the filtering cartridge has a convex platform protruding outward, and the back end of the connection pipe is fixed on the convex platform in threaded connection way.

There are following disadvantage according to the above existing technologies: the filtering core in the existing technologies is an integrated structure, it needs to replace whole filtering core when there is an excessive loss of a part of the filtering material, however, a part of the filtering material in the inner of the filtering core still has a great filtering effect, thereby leading to a great waste, and at same time, which is unable to achieve multiple filters, and unable to fully filter disinfectants, impurities, organic matters, germs and so on in the water.

SUMMARY

For the purpose to fully filter disinfectants, impurities, organic matters, germs, and so on in the water, a filter device, a faucet water purifier and a spraying process thereof.

A filter device, a faucet water purifier and a spraying process thereof according to the present application adopts following solution.

A filter device, comprises a first filter mechanism and a second filter mechanism, the first filter mechanism is connected to the second filter mechanism, wherein the first filter mechanism is configured to filter disinfectants, impurities, and organic matters in water, and the second filter mechanism is configured to filter germs in the water.

By adopting above solution, the first filter mechanism is configured to filter the disinfectants, the impurities, the organic matters, and the second filter mechanism is configured to filter germs in water. Therefore, water quality is purified more complete and cleaner, thereby ensuring a safety of the water, and preventing skin allergies of users.

Optionally, the first filter mechanism comprises a first housing, a plurality of first filtering holes are provided on each of two ends of the first housing, and a polypropylene cotton, a stainless steel mesh, a carbon fiber sheet and a non-woven fabric are provided in the first housing.

By adopting above solution, the polypropylene cotton can intercept sand, debris, impurities, red worms, and filter particles in water; the stainless steel mesh not only improves a support strength of the whole first filter mechanism, but also can intercept particle impurities, such as sand impurities, in the water; the carbon fiber material can remove residual chlorine and chloramine in the water, and adsorb heavy metal substances, carbon tetrachloride, chloroform, volatile phenols, the organic matters, and other substances in the water, so as to further purify the water quality; and the non-woven fabric can intercept particle impurities and reduce water resistance.

Optionally, the second filter mechanism comprises a second housing, an end of the second housing is connected to an end of the first housing, two ends of the second housing are open, and an ultrafiltration membrane filament is fixedly provided in the second housing.

By adopting above solution, the ultrafiltration membrane filament can intercept the germs in water, the water quality is purified more complete and cleaner by multistage filtration.

A faucet water purifier, comprises a case, a switch mechanism and the filter device mentioned above, wherein an inlet channel, a first outlet channel and a second outlet channel are provided on the case, the inlet channel is in communication with the first outlet channel, the inlet channel is in communication with the second outlet channel, the filter device is arranged in the second outlet channel; the switch mechanism is arranged in the inlet channel; when the switch mechanism is in a first position, the switch mechanism blocks the first outlet channel, and the inlet channel is in communication with the second outlet channel; when the switch mechanism is in a second position, the switch mechanism blocks the second outlet channel, and the inlet channel is communication with the first outlet channel.

By adopting above solution, when it is necessary to use clean water, the switch mechanism is switched to the first position, at this time, the water in the faucet is discharged to the second outlet channel by the inlet channel, and the water in the second outlet channel flows under a filtering effect of the filter device, thereby realizing to fully filter the disinfectants, the impurities, the organic matters, and the germs and so on, and at this time, the water discharged by the second outlet channel is used to wash face or take a shower, which can improve the beauty effect of the water on skin, thereby ensuring that the skin becomes more elastic; when it is necessary to use original water, the switch mechanism is switched to a second position, at this time, the water in the faucet is discharged to the first outlet channel by the inlet channel, and ultimately discharged out by the first outlet channel, and at this time, there is no water flowing the filter device, thereby extending a service life of the filter device.

Optionally, the switch mechanism comprises a split-flow component, a switch component and a rotatable drive component; the split-flow component is fixed in the case, a first split-flow channel and a second split-flow channel are provided on the split-flow component, an outlet end of the first split-flow channel is in communication with the first outlet channel, an outlet end of the second split-flow channel is in communication with the second outlet channel; the switch component is rotatably and sealingly provided on the split-flow component; a L-shaped switch channel is provided on the switch component, an inlet end of the L-shaped switch channel is in communication with the inlet channel; when the switch mechanism is in the first position, an outlet end of the L-shaped switch channel is in communication with an inlet end of the second split-flow channel; when the switch mechanism is in the second position, the outlet end of the L-shaped switch channel is in communication with an inlet end of the first split-flow channel; and the rotatable drive component is rotatably provided on the case, and the rotatable drive component is fixedly connected to the switch component.

By adopting above solution, when it is necessary to use the clean water, the rotatable drive component rotates the switch component by rotating the rotatable drive component, such that the switch component is moved to a first position, at this time, the outlet end of the L-shaped switch channel is in communication with the inlet end of the second split-flow channel, the water flows to the second split-flow channel and the second outlet channel by the inlet channel, and is ultimately discharged out by the second outlet channel, since the filter device has a filter effect for the water in the second outlet channel, which is convenience to fully realize to filter the disinfectants, the impurities, the organic matter, the germs and so on in water; when it is necessary to use the original water, the rotatable drive component rotates the switch component, such that the switch component is moved to a second position, at this time, the outlet end of the L-shaped switch channel is in communication with the inlet end of the first split-flow channel, the water flows to the first split-flow channel and the first outlet channel by the inlet channel, and is ultimately discharged out by the first outlet channel, thereby discharging the original water; and the users are convenience to rotate the switch component by rotating the rotatable drive component, which is convenience to choose to discharge the original water or the clean water according to the real demand.

Optionally, a flow control valve is provided in the inlet channel, a plurality of first flow control channels and a second flow control channel are provided on the flow control valve, the plurality of first flow control channels are in communication with the second flow control channel, and the second flow control channel is in communication with the inlet channel.

By adopting above solution, the water in the faucet is discharged to the second flow control channel by a plurality of the first flow control channel, then discharged to the inlet channel by the second flow control channel, and the first flow control channel and the second flow control channel reduce the flow speed of the water in the inner of the faucet water purifier, thereby realizing a flow control effect, simultaneously reducing a water pressure ultimately discharged, realizing that the water punching on the hand or body of the human is very soft, and improving an experience of the users.

Optionally, a first outlet cover is fixedly provided on the case, the first outlet cover is positioned at an outlet end of the first outlet channel, and a plurality of spraying holes are provided on the first outlet cover.

By adopting above solution, the first outlet cover is positioned in the outlet of the first outlet channel, and a plurality of spraying holes are provided on the first outlet cover. Therefore, the water ultimately sprayed by the plurality of the spraying holes forms a shower pattern, thereby ensuring that the water ultimately becomes softer and fuller to spray to the body or the hand of human.

Optionally, the case comprises a cylindrical part, an end covers is detachably connected to each of two ends of the cylindrical part, the filter device is provided in the cylindrical part, an annular protrusion is fixedly provided on an inner side wall of the cylindrical part, a sealing ring is provided between the cylindrical part and the filter device; the annular protrusion divides the cylindrical part into a first cavity and a second cavity, the outlet end of the second split-flow channel is in communication with the first cavity; and the second cavity is in communication with the second outlet channel.

By adopting above solution, the sealing ring, the annular protrusion and the filter device improves the tightness between the first cavity or the second cavity and the cylindrical part. Therefore, the water discharged by the second outlet channel firstly flows to the first cavity, the water in the first cavity flows to the second cavity under the filtering effect of the filter device, and the water in the second cavity is ultimately discharged by the second outlet channel.

Optionally, the end covers are made of a transparent material.

By adopting above solution, when the filter device is used for a long time, a large amount of disinfectants, impurities, organic matters, germs and so on are remained in the filter device, and since the material of the end cover is the transparent material, the users are convenience to observe the filter device via the end cover.

A spraying technology, comprising following steps:
   step one: before spraying, stirring a coating evenly, and coating and brushing at a connection between the coating and a primer;
   step two: ensuring a spraying amount according to a requirement of a thickness of the primer;
   step three: drying the coating;
   step four: continuously swinging a spray gun during the spraying;
   step five: completing the spraying, cooling the faucet water purifier for a period of time, making a surface of the faucet water purifier smooth and flat;
   step six: putting the faucet water purifier into a baking paint cover;
   step seven: selecting an appropriate temperature and time for drying;
   step eight: maintaining sufficient air in the baking paint cover, it can't be excessively heated, and at same time, it should be increased humidity; and
   step nine: taking the faucet water purifier out of the barking paint cover.

By adopting above solution, it can realize that the surface of the case of the faucet water purifier is coated various colors of paint by using above spraying technology, which is convenience to process case in red, burgundy, green, yellow, blue, and other colors, thereby improving an aesthetics of whole faucet water purifier, which is pleasing to the eye.

In summary, the present application has at least one of the following beneficial technical effectives:

1. A polypropylene cotton can intercept sand, debris, impurities, red worms, and filter particles in water; a stainless steel mesh not only improves a support strength of the whole first filter mechanism, but also can intercept particle impurities, such as the sand impurities, in the water; a carbon fiber material can remove residual chlorine and chloramine in the water, and adsorb heavy metal substances, carbon tetrachloride, chloroform, volatile phenols, organic matters, and other substances in the water, so as to further purify the water quality; and a non-woven fabric can intercept particle impurities and reduce water resistance;

2. When it is necessary to use clean water, the switch mechanism is switched to the first position, at this time, the water in the faucet is discharged to the second outlet channel by the inlet channel, and the water in the second outlet channel flows out under a filtering effect of the filter device, thereby realizing to fully filter the disinfectants, the impurities, the organic matters, the germs and so on, and at this time, the water discharged by the second outlet channel is used to wash face or take a shower, which can improve the beauty effect of the water for skin, thereby ensuring that the skin become more elastic; when it is necessary to use original water, the switch mechanism is switched to a second position, at this time, the water in the faucet is discharged to the first outlet channel by the inlet channel, and ultimately discharged out by the first outlet channel, at this time, there is no water flowing the filter device, thereby extending a service life of the filter device; and 3. It can realize that the surface of case of the faucet water purifier is coated various colors of paint by using above spraying technology, which is convenience to process case in red, burgundy, green, yellow, blue, and other colors, thereby improving an aesthetics of whole faucet water purifier, which is pleasing to the eye.

DETAILED DESCRIPTION

The present application is further described in detail below in combination with FIGS. 1-8.

Figure 1:
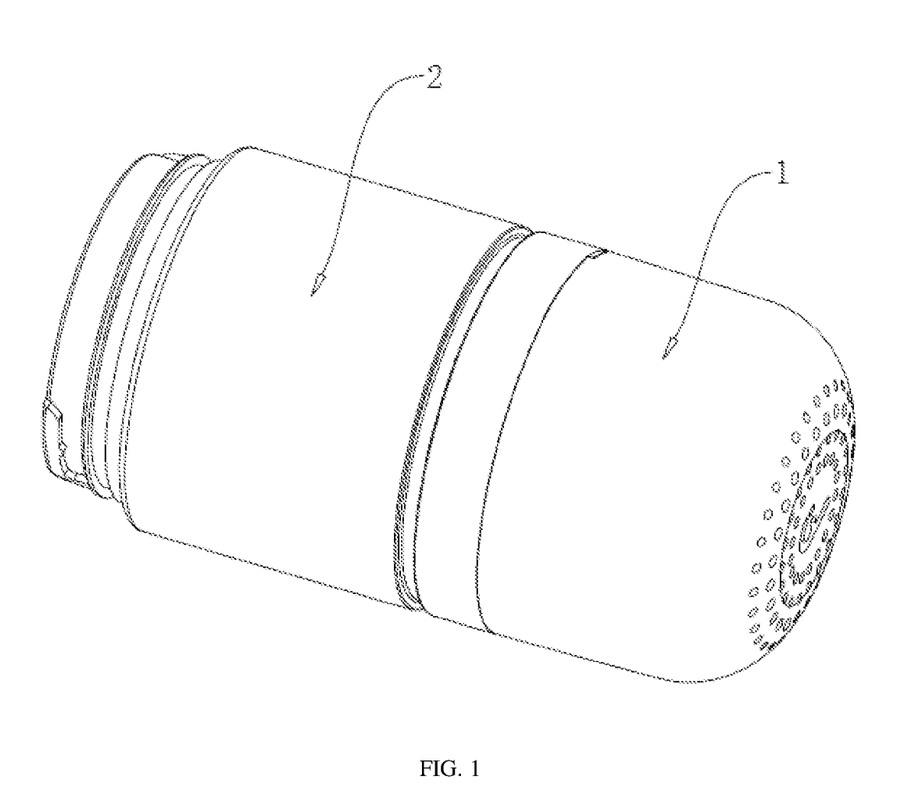
FIG. 1 is a schematic structural diagram of a filter device according to an embodiment of the present application.

A filter device according to an embodiment of the present application is disclosed. Referring to FIG. 1, the filter device comprises a first filter mechanism 1 and a second filter mechanism 2, in which the first filter mechanism 1 is in communication with the second filter mechanism 2. In particular, the first filter mechanism 1 is configured to filter disinfectants, impurities, and organic matters in water; and the second filter mechanism 2 is configured to filter germs in the water. The first filter mechanism 1 is configured to filter the disinfectants, the impurities, the organic matters, and the second filter mechanism 2 is configured to filter germs in water. Therefore, water quality is filtered more complete and cleaner, thereby further ensuring a safety of the water, and preventing skin allergies of users, which possesses beauty and protection for skin.

Figure 2:
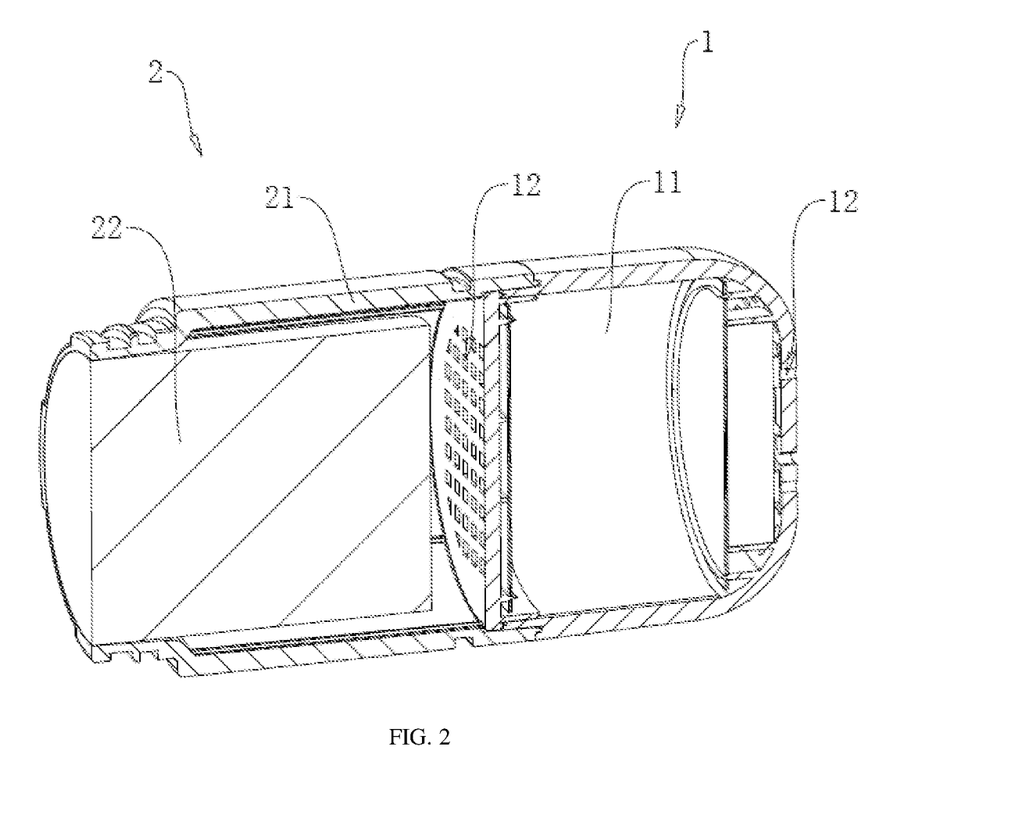
FIG. 2 is a semi-sectional view of the filter device according to an embodiment of the present application.

Referring to FIG. 2, in the present application, the first filter mechanism 1 comprises a first housing 11, a plurality of first filtering holes 12 are provided on two ends of the first housing 11, a polypropylene cotton, a stainless steel mesh, a carbon fiber sheet and a non-woven fabric are provided in the first housing 11, there is no limitation for specific number and arrangement. The polypropylene cotton can intercept sand, debris, impurities, red worms, and filter particles in water; the stainless steel mesh not only improves a support strength of the whole first filter mechanism 1, but also can intercept particle impurities, such as the sand impurities, in the water; the carbon fiber material can remove residual chlorine and chloramine in the water, and adsorb heavy metal substances, carbon tetrachloride, chloroform, volatile phenols, the organic matters, and other substances in the water, so as to further purify the water quality; and the non-woven fabric can intercept particle impurities and reduce water resistance.

Continuously referring to FIG. 2, a second filter mechanism 2 comprises a second housing 21, the end of the second housing 21 is sealingly connected to the end of the first housing 11, in which the specific connection way can be thread fit, snap fit, or plug fit, which is convenience to install and detach the filter device for users. Two ends of the second housing 21 are both provided with opening, and an ultrafiltration membrane filament 22 is fixed in the second housing 21, the specific connection way can adopt splice to fix. The ultrafiltration membrane filament 22 can intercept the germs in the water, water quality is purified more complete and cleaner under a filter effect of the first filter mechanism 1 and the second filter mechanism 2, thereby preventing skin allergies for the users.

Figure 3:
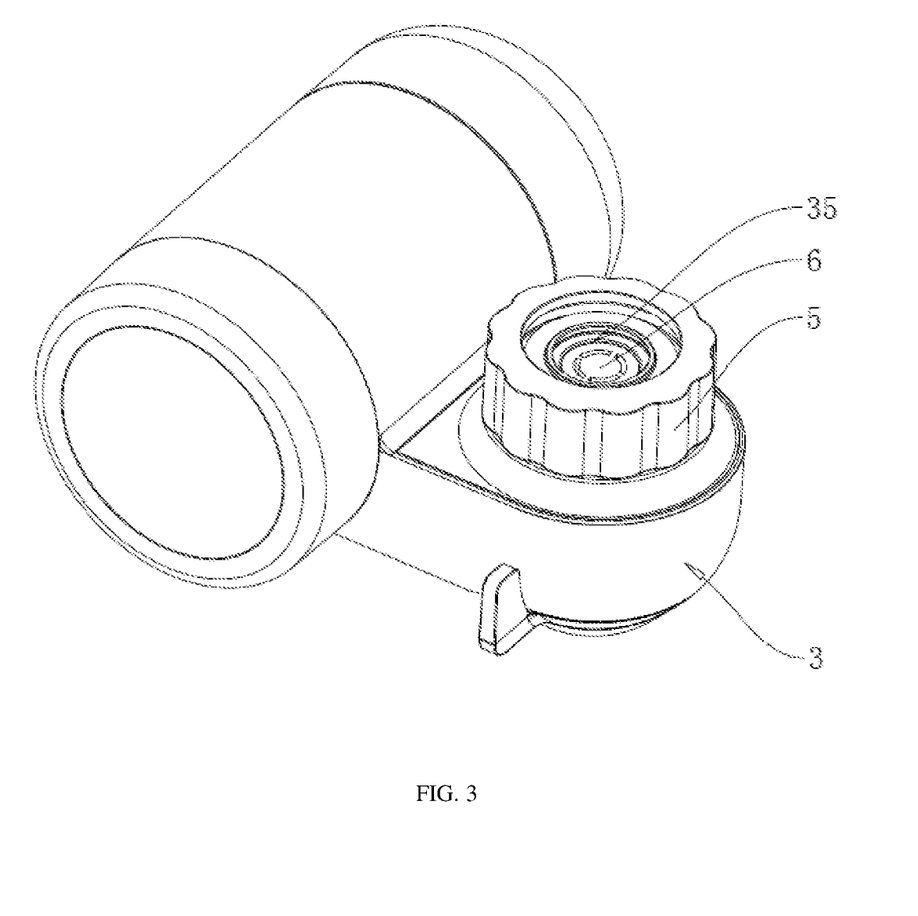
FIG. 3 is a schematic structural diagram of a faucet water purifier according to an embodiment of the present application.
Figure 4:
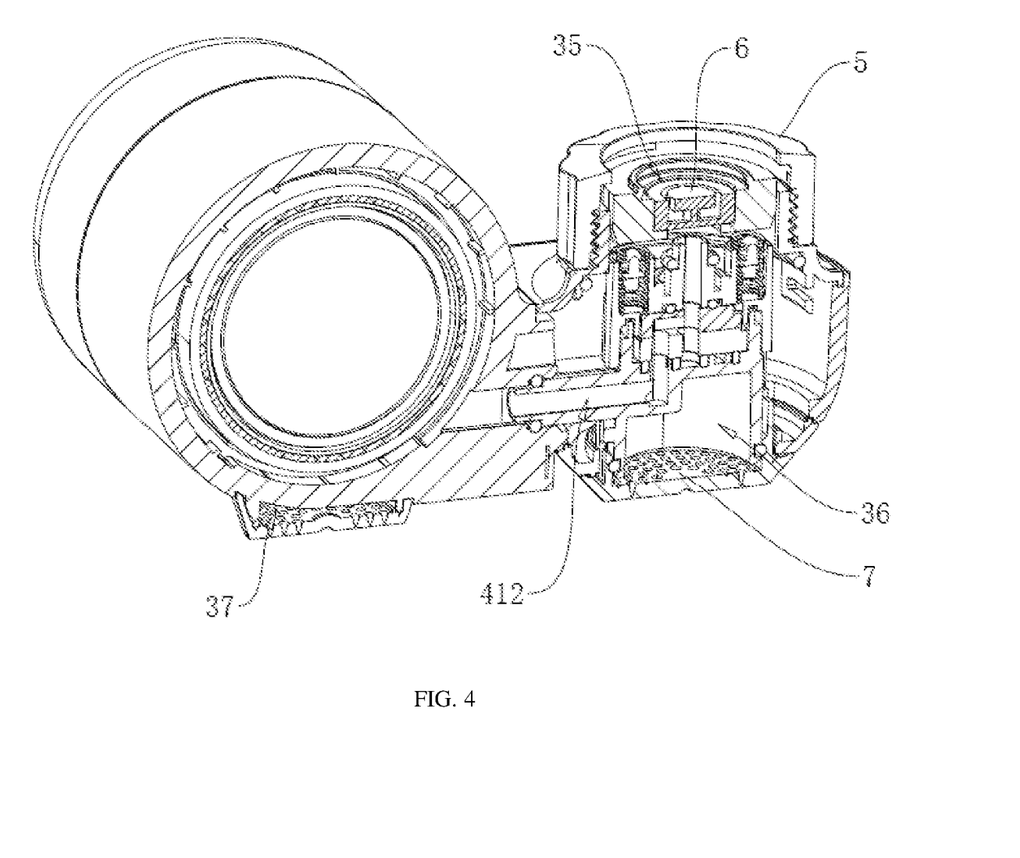
FIG. 4 is a partial sectional view of the faucet water purifier according to an embodiment of the present application.

Referring to FIGS. 3 and 4, a faucet water purifier comprises above filter device, and further comprises an case 3 and an switch mechanism 4, an inlet channel 35, an first outlet channel 36 and an second outlet channel 37 are provided on the case 3, a connector 5 is threated on the inlet channel 35, which is convenience to install the faucet water purifier on a faucet by connection, and convenience to install and detach the filter device for the users. The inlet channel 35 is in communication with the first outlet channel 36, and in communication with the second outlet channel 37, and the filter device is positioned in the second outlet channel 37. The switch mechanism 4 is provided in the inlet channel 35, when the switch mechanism 4 is in a first position, the switch mechanism 4 blocks the first outlet channel 36, and the inlet channel 35 is in communication with the second outlet channel 37 at this time; when the switch mechanism 4 is in a second position, the switch mechanism 4 blocks the second outlet channel 37, the inlet channel 35 is communication with the first outlet channel 36

Continuously referring to FIGS. 3 and 4, when it is necessary to use the clean water, the switch mechanism 4 is switched to a first position, at this time, the water in the faucet is discharged to the second outlet channel 37 by the inlet channel 35, and the water in the second outlet channel 37 flows out under the filter effect of the filter device, thereby realizing to fully filter the disinfectants, the impurities, the organic matters, germs and so on, and at this time, the water discharged by the second outlet channel 37 is used to wash face or take a shower, which can improve the beauty effect of the water for the skin, thereby ensuring that the skin is more elastic. When it is necessary to use the original water, the switch mechanism 4 is switched to a second position, and at this time, the water in the faucet water purifier is discharged to the first outlet channel 36 by the inlet channel 35, and ultimately discharged out by the first outlet channel 36, and at this time, there is no water flowing the filter device, thereby extending the service life of the filter device.

Continuously referring to FIGS. 3 and 4, in the present application, the inner diameters of the inlet channel 35, the first outlet channel 36 and the second outlet channel 37 are relatively small, in which the inner diameter of the inlet channel 35 ranges in 1 mm to 10 mm, so as to slow down the flow speed of the water in the inlet channel 35, the first outlet channel 36 and the second outlet channel 37, which has functions of water conservation, flow control and pressure reduction, thereby ensuring that the water flowed from the faucet water purifier is very soft.

Figure 5:
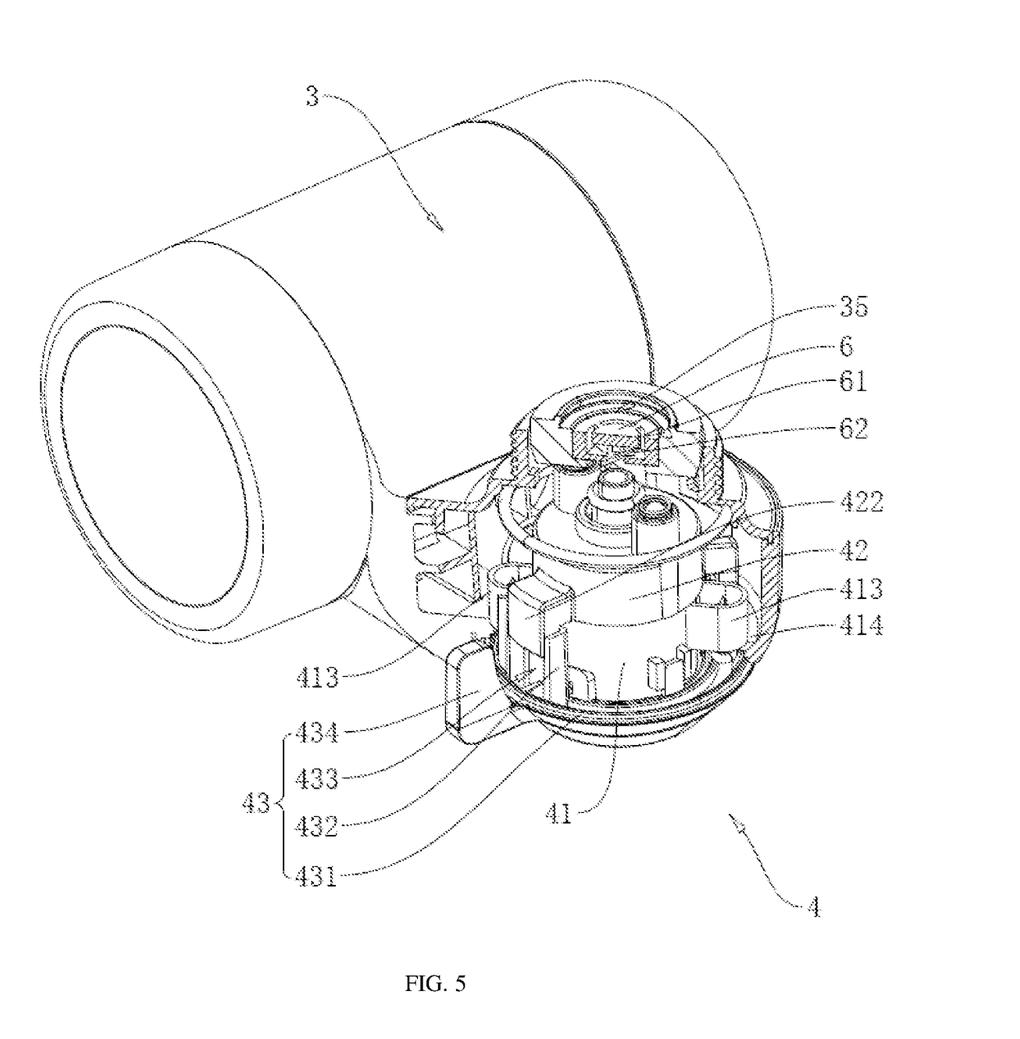
FIG. 5 is a partial sectional view from another perspective of the faucet water purifier according to the embodiment of the present application in another view.
Figure 6:
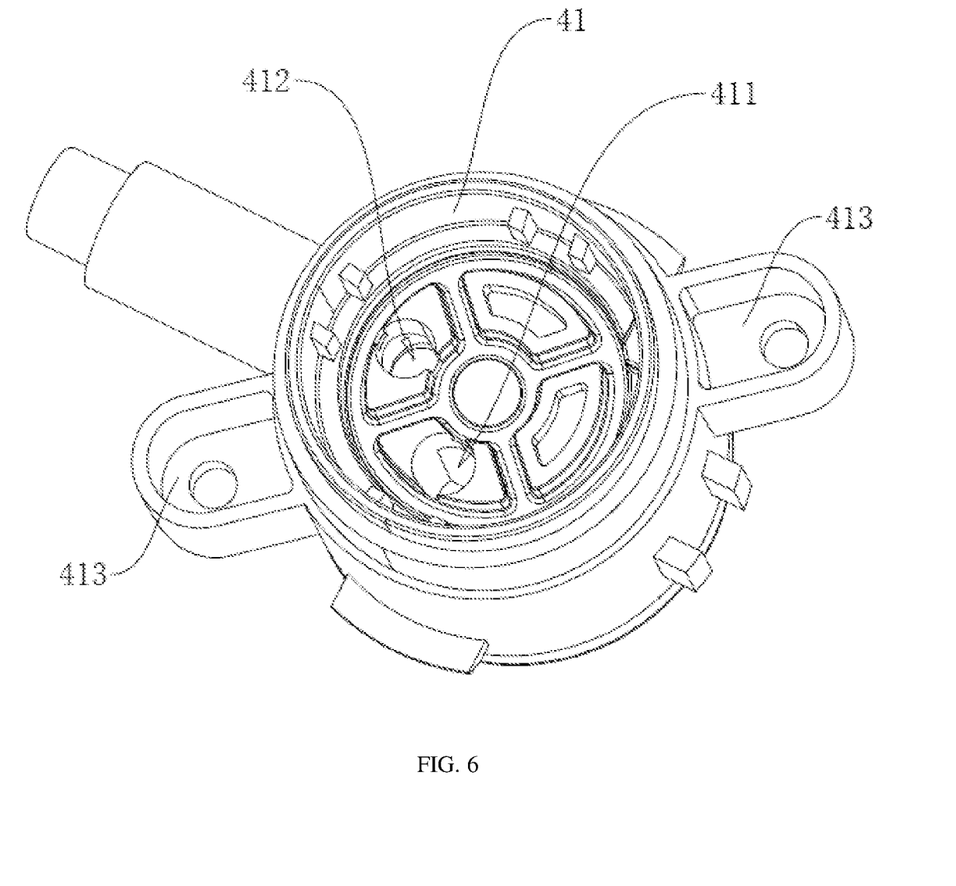
FIG. 6 is a schematic structural diagram of a split-flow component according to an embodiment of the present application.

Referring to FIGS. 5 and 6, in the present application, the switch mechanism 4 comprises a split-flow component 41, a switch component 42 and a rotatable drive component 43, the split-flow component 41 is integrated with two first connecting parts 413, the inner of the case 3 is integrated with two second connecting parts 414, the first connecting parts 413 are corresponding to the second connecting parts 414, respectively, each of the first connecting part 413 is fixed with the second connecting part 414 by the bolt, thereby realizing to fix the split-flow component 41 in the inner of the case 3, which is convenience to install and detach the split-flow component 41 for the operator. A first split-flow channel 411 and a second split-flow channel 412 are provided on the split-flow component 41, the outlet end of the first split-flow channel 411 is in communication with the first outlet channel 36, and the outlet end of the second split-flow channel 412 is in communication with the second outlet channel 37.

Figure 7:
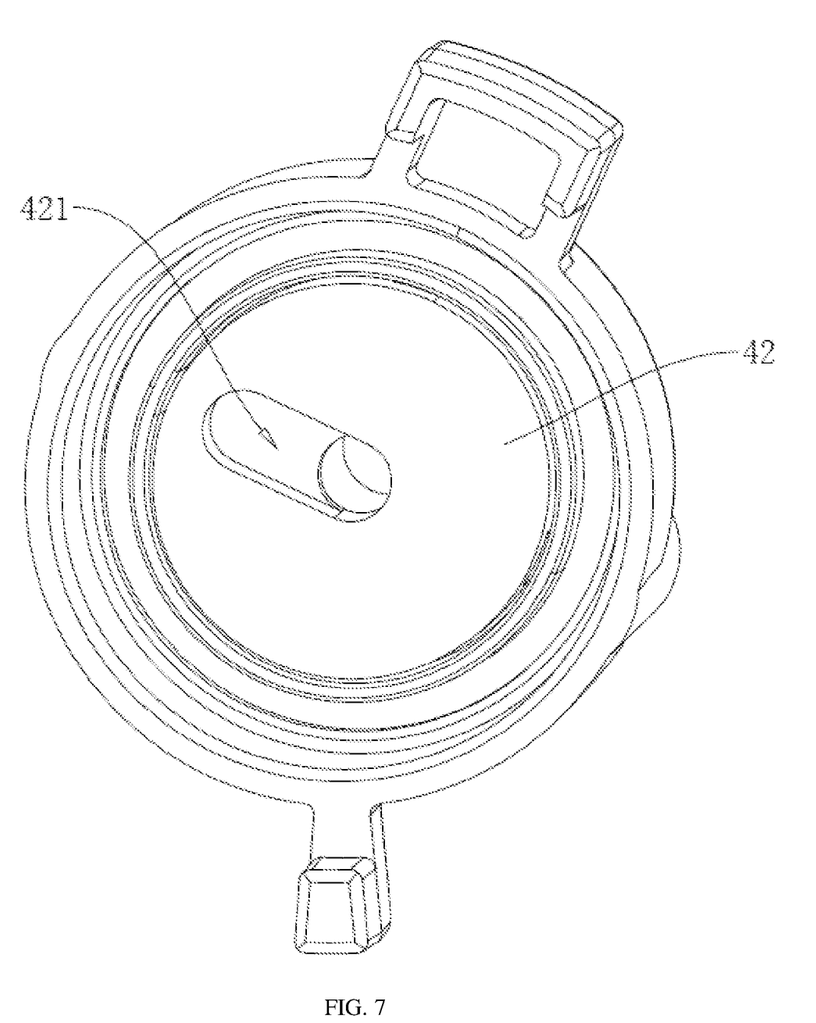
FIG. 7 is a schematic structural diagram of a switch component according to an embodiment of the present application.

Referring to FIGS. 6 and 7, the switch component 42 is rotatably and sealingly provided on the split-flow component 41. A L-shaped switch channel 421 is provided on the switch component 42, and the inlet end of the L-shaped switch channel 421 is in communication with the inlet channel 35. When the switch component 42 is in a first position, the inlet end of the L-shaped switch channel 421 is in communication with the inlet end of the second split-flow channel 412; when the switch component 42 is in a second position, the outlet end of the L-shaped switch channel 421 is in communication with the outlet end of the first split-flow channel 411. The rotatable drive component 43 is rotatably provided on the case 3, and fixedly connected to the switch component 42.

Referring to FIGS. 4 and 6, when it is necessary to use clean water, the rotatable drive component 43 rotates the switch component 42 by rotating the rotatable drive component 43, such that the switch component 42 is moved to a first position, at this time, the outlet end of the L-shaped switch channel 421 is in communication with the inlet end of the second split-flow channel 412, the water successively flows to the second split-flow channel 412 and the second outlet channel 37 by the inlet channel 35, and is ultimately discharged out by the second outlet channel 37, since the filter device has a filter effect for the water in the second outlet channel 37, which is convenience to fully realizing to filter the disinfectants, the impurities, the organic matters, the germs and so on in the water; when it is necessary to use original water, the rotatable drive component 43 rotates the switch component 42 by rotating the rotatable drive component 43, such that the switch component 42 is moved to a second position, at this time, the outlet end of the L-shaped switch channel 421 is in communication with the inlet end of the first split-flow channel 411, the water successively flows to the first split-flow channel 411 and the first outlet channel 36, and is ultimately discharged out by the first outlet channel 36, so as to discharge the original water out; and the users are convenience to rotate the switch component 42 by rotating the rotatable drive component 43, which is convenience to choose to discharge the original water or the clean water according to the real demand.

Referring to FIG. 5, in the present application, the rotatable drive component 43 comprises an annular rotatable part 431, the annular rotatable part 431 is sleeved on the split-flow component 41, the annular rotatable part 431 is rotatably connected to the split-flow component 41, the annular rotatable part 431 is rotatably and sealingly connected to the case 3. The inner side wall of the annular rotatable part 431 is integrated with two limiting parts 432, and the two limiting parts 432 are both provided with limiting grooves 433, respectively. Correspondingly, the respectively two sides of the switch component 42 are integrated with two limiting blocks 422, respectively, the two limiting blocks 422 are distributed in the two limiting grooves 433, respectively, and the two limiting blocks 422 are snapped with the two limiting grooves 433, respectively. The annular rotatable part 431 rotates the two limiting parts 432 by rotating the annular rotatable part 431 during the rotation, two limiting parts 432 rotates the two limiting blocks 422, respectively, two limiting blocks 422 simultaneously rotates the switch component 42, respectively, which is convenience to realizing the switch between the original water and the clean water.

Continuously referring to FIG. 5, furthermore, the annular rotatable part 431 is integrated with a handle part 4341, the handle part 4341 is positioned out of the case 3, the users are convenience to rotate the annular rotatable part 431 by rotating the handle part 4341, thereby having a labor saving effect.

Continuously referring to FIG. 5, a flow control valve 6 is provided in the inlet channel 35, a plurality of first flow control channels 61 and a second flow control channel 62 are provided on the flow control valve 6, the plurality of first flow control channels 61 are in communication with the second flow control channel 62, and the second flow control channel 62 is in communication with the inlet channel 35. In the present application, the inner diameters of the first flow control channels 61 and the second flow control channel 62 are relatively small. The water in the faucet water purifier is discharged to the second flow control channel 62 by the plurality of the first flow control channels 61, and then discharged to the inlet channel 35 by the second flow control channel 62, the first flow control channel 61, the second flow control channel 62, the inlet channel 35, the first discharging channel and the second discharging channel all reduces a flow speed of the water in the faucet water purifier, thereby realizing a flow control effect, and at same time, reducing water pressure ultimately discharged out, and finally, the water punching on the hand or body of the human is very soft, which has functions of the water conservation, the flow control, and the pressure reduction, and improves the experience of the users.

Continuously referring to FIG. 5, in the present application, the inner diameters of the plurality of the first flow control channel 61 and the second flow control channel 62 range in 0.5 mm to 1.5 mm, which not only reduces the flow speed of the water in the first flow control channels 61, but also reduces the flow speed of the water in the second flow control channel 62.

Figure 8:
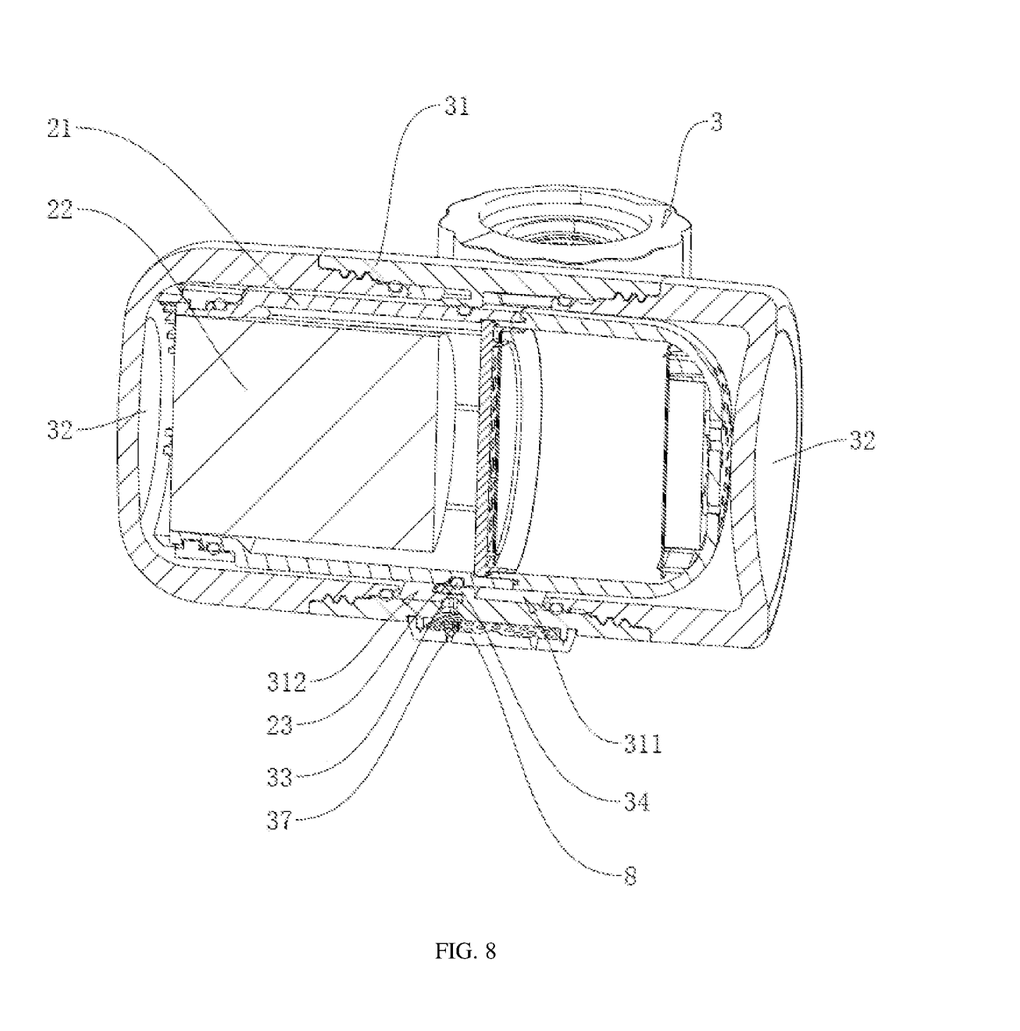
FIG. 8 is a semi-sectional view of a filter mechanism according to an embodiment of the present application.

Referring to FIGS. 5 and 8, the case 3 comprises a cylindrical part 31, two end covers 32 are detachably connected to two ends of the cylindrical part 31, respectively, the filter device is provided in the cylindrical part 31, a annular protrusion 34 is fixedly provided on an inner side wall of the cylindrical part 31, an annular limiting groove 23 is provided on the outer surface of the second housing 21, a sealing ring 33 is sleeved on the annular limiting groove 23, the outer side wall of the sealing ring 33 abuts on the inner side wall of the annular protrusion 34, the annular sealing ring 33 and the annular protrusion 34 divides the cylindrical part 31 into a first cavity 311 and a second cavity 312, and the outlet end of the second split-flow channel 412 is in communication with the first cavity 311. The second cavity 312 is in communication with the second outlet channel 37. The sealing ring 33, the annular protrusion 34 and the filter device improve the tightness between the first cavity 311 or the second cavity 312 and the cylindrical part 31. Therefore, the water discharged by the second outlet channel 37 firstly flows to the first cavity 311, then the water in the first cavity 311 is successively flows to the second cavity 312 (in combination with FIG. 1) under the filter effect of the first filter mechanism 1 and the second filter mechanism 2, and the water in the second cavity 312 is ultimately discharged out by the second outlet channel 37.

Referring to FIG. 8, in the present application, the material of at least one end cover 32 is a transparent material. When the filter device is used for a long time, a large amount of the disinfectants, the impurities, the organic matters, the germs and so on are remained in the filter device, and since the material of the end cover 32 is the transparent material, the users are convenience to observe the filter device via the end cover 32.

Referring to FIGS. 4 and 8, a first outlet cover 7 and a second outlet cover 8 are fixedly provided on the case 3, the first outlet cover 7 is positioned at the outlet end of the first outlet channel 36, the second outlet cover 8 is positioned at the outlet end of the second outlet channel 37, a plurality of spraying holes are provided on the first outlet cover 7 and the second outlet cover 8, in which the diameter of the spraying hole ranges in 0.3 mm to 1 mm, and the plurality of the spraying holes are distributed evenly. The aesthetics of whole structure is improved; the water is sprayed from the plurality of the spraying holes, the plurality of the spraying holes have a flow control effect for the water, thereby ensuring that the sprayed water is very soft, and having a pressure reduction effect, and the water ultimately sprayed from the plurality of the spraying holes forms a shower pattern, thereby ensuring that the water ultimately becomes softer and fuller to spray to the body or the hand of human.

A spraying technology comprises following steps:
step one: before spraying, stirring a coating evenly, and coating and brushing at a connection between the coating and a primer;
step two: ensuring a spraying amount according to a requirement of a thickness of the primer;
step three: drying the coating;
step four: continuously swinging a spray gun during the spraying;
step five: completing the spraying, cooling the faucet water purifier for a period of time, making the surface of the faucet water purifier smooth and flat;
step six: putting the faucet water purifier into a baking paint cover;
step seven: selecting an appropriate temperature and time for drying;
step eight: maintaining sufficient air in the baking paint cover, which can't be excessively heated, and at same time, should be increased humidity; and
step nine: taking the faucet water purifier out of the barking paint cover.

The implementation principle of the above embodiment is as follows: when it is necessary to use the clean water, the rotatable drive component 43 rotates the switch component 42 by rotating the rotatable drive component 43, such that the switch component 42 is moved to a first position, at this time, the outlet end of the L-shaped switch channel 421 is in communication with the inlet end of the second split-flow channel 412, the water successively flows to the second split-flow channel 412 and the second outlet channel 37 by the inlet channel 35, and is ultimately discharged out by the second outlet channel 37, since the filter device has a filter effect for the water in the second outlet channel 37, which is convenience to fully realizing to filter the disinfectants, the impurities, the organic matters, the germs and so on in the water, thereby preventing the skin allergies of users; when it is necessary to use the original water, the rotatable drive component 43 rotates the switch component 42 by rotating the rotatable drive component 43, such that the switch component 42 is moved to a second position, at this time, the outlet end of the L-shaped switch channel 421 is in communication with the inlet end of the first split-flow channel 411, the water successively flows to the first split-flow channel 411 and the first outlet channel 36 by the inlet channel 35, and is ultimately discharged out by the first outlet channel 36, so as to discharge the original water out; and the users are convenience to rotate the switch component 42 by rotating the rotatable drive component 43, which is convenience to choose to discharge the original water or the clean water according to the real demand.

The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS 1 first filter mechanism
11 first housing
12 first filtering hole
2 second filter mechanism
21 second housing
22 ultrafiltration membrane filament 23 annular limiting groove
3 case
31 cylindrical part
311 first cavity
312 second cavity
32 end cover
33 sealing ring
34 annular protrusion
35 inlet channel
36 first outlet channel
37 second outlet channel
4 switch mechanism
41 split-flow component
411 first split-flow channel
412 second split-flow channel
413 first connecting part
414 second connecting part
42 switch component
421 L-shaped switch channel
422 limiting block
43 rotatable drive component
431 annular rotatable part
432 limiting part
433 limiting groove
5 connector
6 flow control valve
61 first flow control channel
62 second flow control channel
7 first outlet cover
8 second outlet cover

What is claimed is:

1. A faucet water purifier, comprising: a case, a switch mechanism and a filter device, wherein the filter device comprises a first filter mechanism and a second filter mechanism, wherein the first filter mechanism is connected to the second filter mechanism, the first filter mechanism is configured to filter disinfectants, impurities, and organic matters in water, and the second filter mechanism is configured to filter germs in the water;

wherein an inlet channel, a first outlet channel and a second outlet channel are provided on the case, the inlet channel is in communication with the first outlet channel, the inlet channel is in communication with the second outlet channel, the filter device is arranged in the second outlet channel; the switch mechanism is arranged in the inlet channel; when the switch mechanism is in a first position, the switch mechanism blocks the first outlet channel, and the inlet channel is in communication with the second outlet channel; and when the switch mechanism is in a second position, the switch mechanism blocks the second outlet channel, and the inlet channel is in communication with the first outlet channel; and wherein the switch mechanism comprises a split-flow component, a switch component and a rotatable drive component; the split-flow component is fixed in the case, a first split-flow channel and a second split-flow channel are provided on the split-flow component, an outlet end of the first split-flow channel is in communication with the first outlet channel, an outlet end of the second split-flow channel is in communication with the second outlet channel; the switch component is rotatably and sealingly provided on the split-flow component; an L-shaped switch channel is provided on the switch component, an inlet end of the L-shaped switch channel is in communication with the inlet channel; when the switch mechanism is in the first position, an outlet end of the L-shaped switch channel is in communication with an inlet end of the second split-flow channel; when the switch mechanism is in the second position, the outlet end of the L-shaped switch channel is in communication with an inlet end of the first split-flow channel; and the rotatable drive component is rotatably provided on the case, and the rotatable drive component is fixedly connected to the switch component.

2. The faucet water purifier according to claim 1, wherein a flow control valve is provided in the inlet channel, a plurality of first flow control channels and a second flow control channel are provided on the flow control valve, the plurality of first flow control channels are in communication with the second flow control channel, and the second flow control channel is in communication with the inlet channel.

3. The faucet water purifier according to claim 1, wherein a first outlet cover is fixedly provided on the case, the first outlet cover is arranged at an outlet end of the first outlet channel, and a plurality of spraying holes are provided on the first outlet cover.

4. The faucet water purifier according to claim 1, wherein the case comprises a cylindrical part, an end cover is detachably connected to each of two ends of the cylindrical part, the filter device is provided in the cylindrical part, an annular protrusion is fixedly provided on an inner side wall of the cylindrical part, a sealing ring is provided between the cylindrical part and the filter device; the annular protrusion divides the cylindrical part into a first cavity and a second cavity, the outlet end of the second split-flow channel is in communication with the first cavity; and the second cavity is in communication with the second outlet channel.

5. The faucet water purifier according to claim 4, wherein the end cover is made of a transparent material.

* * * * *